United States Patent [19]

El-Allawy

[11] Patent Number: 4,698,136
[45] Date of Patent: Oct. 6, 1987

[54] PROCESS FOR THE CONTINUOUS PRODUCTION OF BOILER FEED WATER

[75] Inventor: Mohammed El-Allawy, Bremen, Fed. Rep. of Germany

[73] Assignee: Fried Krupp GmbH, Essen, Fed. Rep. of Germany

[21] Appl. No.: 737,014

[22] Filed: May 23, 1985

[30] Foreign Application Priority Data

May 23, 1984 [DE] Fed. Rep. of Germany ....... 3419171

[51] Int. Cl.$^4$ .......................... B01D 3/10; B01D 19/00
[52] U.S. Cl. ........................................ 203/11; 203/24;
203/27; 203/40; 203/47; 203/89; 203/90;
203/91; 203/DIG. 8; 202/176; 202/182;
202/197; 202/202; 202/205; 202/236; 159/4.07;
159/13.3; 159/24.3; 159/46; 159/48.2; 159/49;
159/DIG. 16; 159/47.3; 210/787; 210/799
[58] Field of Search ........................ 203/11, 24, 27, 39,
203/40, 47, DIG. 8, 4, 10, DIG. 14, 90, 91, 89,
12; 202/197, 205, 236, 176, 182, 202; 159/47.3,
46, 4.07, 5, 3, 22-24.3, 31, 47.1, 48.1, 13.3, 48.2,
49, DIG. 16; 210/787, 799; 122/DIG. 3; 55/36,
183, 418

[56] References Cited

U.S. PATENT DOCUMENTS

| | | | |
|---|---|---|---|
| 3,026,261 | 3/1962 | Mayfield et al. | 203/10 |
| 3,099,607 | 7/1963 | Lustenader et al. | 203/10 |
| 3,405,058 | 10/1968 | Miller | 203/11 |
| 3,409,067 | 11/1968 | Dunklin et al. | 202/236 |
| 3,411,992 | 11/1968 | Mitchell | 203/11 |
| 3,501,384 | 3/1970 | Starmer | 203/11 |
| 3,783,108 | 1/1974 | Huhta-Koivisto et al. | 203/11 |
| 3,951,753 | 4/1976 | Roller | 203/11 |
| 3,990,951 | 11/1976 | Rajakovics | 203/11 |
| 3,997,408 | 12/1976 | Barba et al. | 203/11 |
| 4,030,985 | 6/1977 | Barba et al. | 203/11 |
| 4,427,495 | 1/1984 | Masero | 203/11 |
| 4,518,505 | 5/1985 | Lim et al. | 203/11 |

FOREIGN PATENT DOCUMENTS

| | | | |
|---|---|---|---|
| 0043275 | 3/1983 | Japan | 203/11 |
| 0805747 | 12/1958 | United Kingdom | 203/11 |

Primary Examiner—S. Leon Bashore
Assistant Examiner—V. Manoharan
Attorney, Agent, or Firm—Sughrue, Mion, Zinn, Macpeak, and Seas

[57] ABSTRACT

A process for the continuous production of boiler feed water from process waters in the oil extraction industry during which salts and hydrocarbons are removed from the water, without $Fe^{++}$ precipitating. The heavy hydrocarbons are mechanically separated, the volatile hydrocarbons are separated from the water, by means of a thermal degassing, and the low boiling and the non-condensable hydrocarbons are separated in a shower evaporation step with downstream vapor compression, wherein the low boiling non-condensable hydrocarbons are evaporated with the waste water within the shower evaporator and the non-condensable hydrocarbons then are drawn off from a downstream separator. A salt-free oxygen-free pure water is removed from a separator.

13 Claims, 2 Drawing Figures

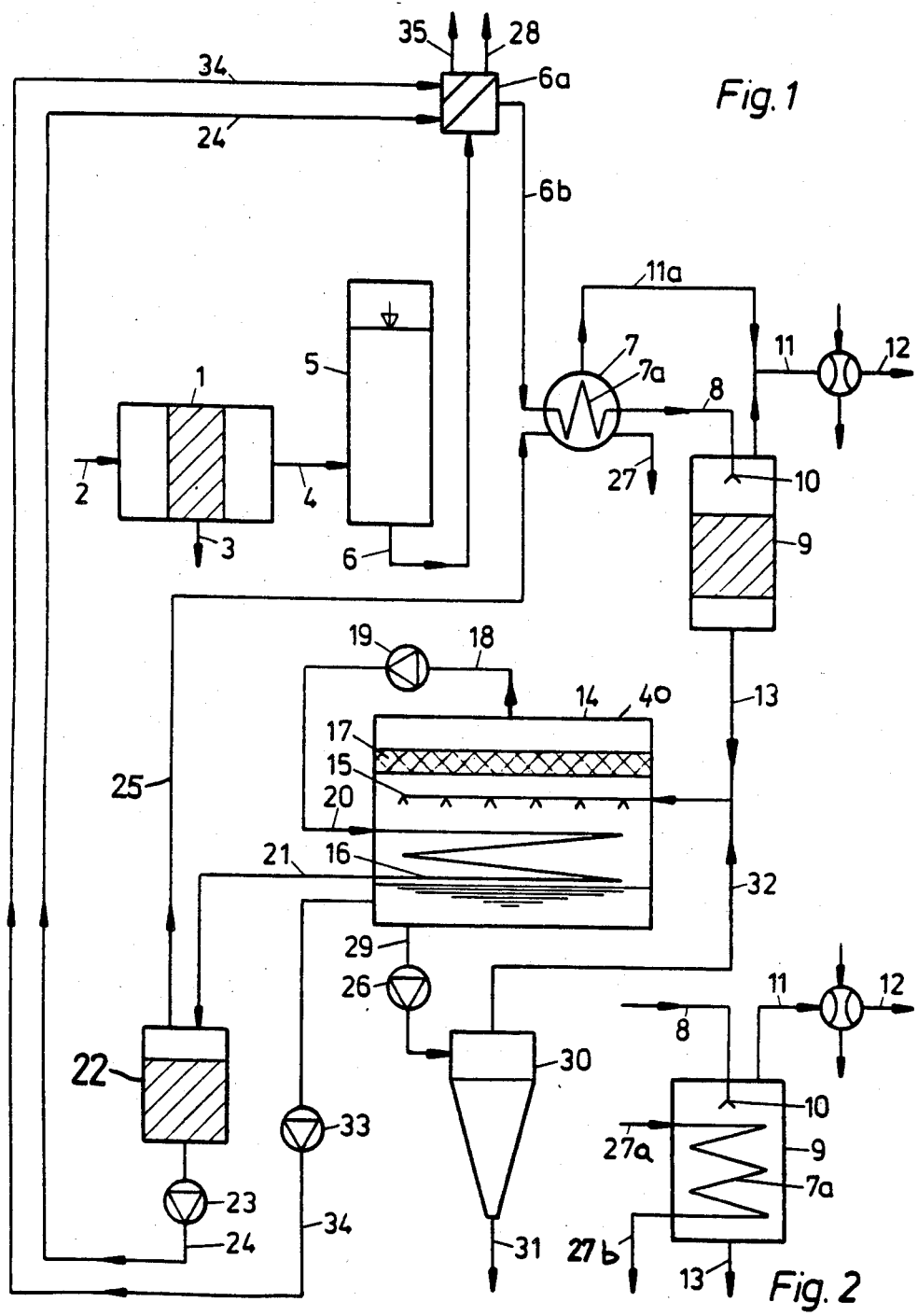

PROCESS FOR THE CONTINUOUS PRODUCTION OF BOILER FEED WATER

BACKGROUND OF THE INVENTION

The present invention relates to a process for the continuous production of pure water for boiler feed from waters containing salt, hydrocarbons and $Fe^{++}$.

Waters of this kind containing salt, hydrocarbons and $Fe^{++}$ are obtained, for example, as process waters in the petroleum extracting industry and in this case, particularly, as surplus waters from steam flood installations. These waters are difficult to reprocess and reuse. Recovery of petroleum extracted from meager deposits requires a high expenditure of energy. The petroleum extracting industry produces high pressure steam in its own boilers. Steam generators require pure water as boiler feed water.

Desalination devices for waters are known in many forms. Separating hydrocarbons from water is also known. For boiler feed water, salts and hydrocarbons must especially be removed. In doing so, the twice positively charged Fe ions ($Fe^{++}$) must be prevented from oxidizing and depositing.

SUMMARY OF THE INVENTION

A primary object of the present invention is to create a process by which waters containing salt, hydrocarbon and $Fe^{++}$ can be converted into boiler feed water without $Fe^{++}$ precipitation, and therefore without depositing $Fe^{++}$ on heating surfaces and other installation parts.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for the continuous production of pure water for boiler feed from waste waters containing salt, hydrocarbon and $Fe^{++}$, comprising: mechanically purfying the waste waters, subjecting the mechanically purified waters to a thermal degassing under vacuum in the absence of air in the degasser, subjecting the resulting thermally degassed waters to a shower evaportion in a shower evaporator to produce vapor, subjecting the so produced vapor to a mechanical vapor compression, passing the so produced compressed vapor through the heating surfaces of the shower evaporator to condense the vapor inside the heating surfaces and form purified water, the passing being conducted in such a manner that the shower evaporation is conducted at a lower temperature, compared to the condensation process inside the heating surfaces feeding the condensed water from the heating surfaces of the shower evaporator under a gas vapor- and hydrocarbon vapor-atmosphere to a separator to separate the condensed water from non-condensable hydrocarbons, removing the condensed water from the separator, and drawing off the non-condensable hydrocarbons from the separator.

In the process of the present invention, the heavy hydrocarbons are separated out of the water to be purified by the mechanical purification. The volatile hydrocarbons are separated out of the water to be purified by the thermal degassing. The remaining low boiling hydrocarbons still present in the water after the thermal degassing are separated by a shower evaporation are then compressed, and the compressed vapors are subjected to a condensation process in the heating surfaces of the shower evaporator, by which a purified distillate condenses out. The purified distillate can be expanded in a separator, and some non-condensable hydrocarbons still present in the distillate and expanded vapors of the distillate can consequently be drawn off from the separator, so that a desalinated pure water, free of oxygen, can be removed.

The evaporation/separation process works especially advantageously if the temperature difference between the evaporation process and the condensation process amounts to about 3° to 5° C.

In the process according to the present invention, the waters do not come in contact with oxygen during the entire treatment, so that no $Fe^{+++}$ can precipitate. A further advantage of this measure is that no deposits result anywhere in the entire process, which deposits would lead to contamination of the installation parts and consequently to problems in the process.

Preferably, the mechanically purified waters are stabilized before the thermal degassing.

The thermal degassing preferably is carried out by means of vapor from the expanded distillate and associated non-condensable gases.

In one preferred embodiment of the present invention, the thermal degassing is carried out in a joint step, that is, the heating of the water and the degassing of the water are performed in a common step.

The vapors resulting from the shower evaporation preferably are passed through a demister with a coalescense effect before the condensation.

Preferably, the volatile hydrocarbons from the degassing step are removed from the degasser by means of a vacuum pump or a jet compressor.

It is also preferred that waste liquor from the shower evaporation is passed through a cyclone, from which solid components are drawn off.

It is to be understood that both the foregoing general description and the following detailed description are exemplary and explanatory, but are not restrictive of the invention.

BRIEF DESCRIPTION OF THE DRAWINGS

FIG. 1 shows a flow chart of one embodiment of the process according to the present invention.

FIG. 2 shows a further embodiment of the thermal degassing which can be employed in the present invention.

DETAILED DESCRIPTION OF THE INVENTION

The waters to be treated are fed by a supply line 2 to a mechanical purifier 1 in which the waters are subjected to a mechanical purification step. Mechanical purifier 1 can be a conventional purifier such as a mechanically functioning filter and removes solid materials, such as, for example salts, solid impurities, such as sand, or the like. Heavy hydrocarbons, such as, for example, impurified heavy oils contained in the waters are mechanically removed and drawn off from purifier 1 over a supply line 3.

The mechanically purified waters from purifier 1 are introduced by a pipe 4 into stabilizer 5 where the waters are subjected to a stabilization step. In particular, stabilizer 5 is a flow chamber that prevents the creation of turbulent streams and thus provides a generally quiescent or stabilized water. Stabilized water from stabilizer 5 is conducted through a pipe 6 to a preheater 6a and from there via a pipe 6b to a final preheater 7 having heating surfaces 7a to effect preheating of the water. The preheated water reaches a degasser 9 by means of a pipe 8 and a spray device 10. Volatile hydrocarbons (gaseous hydrocarbons) are drawn off from degasser 9 by means of a pipe 11 and a jet pump 12. Moreover, volatile components (gaseous materials which result from the heating of the waste waters and which can be hydrocarbons and which can include oxygen) are drawn off from final preheater 7 in the same way, that is, by means of a pipe 11a which is connected to jet pump 12.

The thermally degassed water leaving degasser 9 still contains low boiling remaining hydrocarbons which generally are not condensable and is fed by a pipe 13 to a shower evaporator 14 comprising a vessel 40 containing a spray system 15 in the form of spray nozles and a heat exchanger 16 in the form of an evaporation pipe which can be a heating coil heated by electric energy. The waters from pipe 13 reach spray nozzles 15 and are discharged therefrom. The waters in fine stream are distributed evenly as a thin film on the outside of the evaporation pipe of heat exhanger 16 where they are heated to form vapors. The vapors formed by the evaporation are water vapors produced from the waste water and vapors of the non-condensable hydrocarbons.

The vapors formed by the evaporation pass through a demister 17 in evaporator 14. Demister 17 is a drop separator which can be comprised of a ceramic, metallic, or textile fiber material. When, for example, oils are found in the waste waters, these oils deposit on the demister. As the process progresses, the oils are attracted from the vapors by the oils already present on the demister, (that is, the previously deposited oils) and consolidate with the oils already present in the demister. The demister can be prelubricated with the media to be separated, for example oil, at the time of the beginning of the operation, and such a demister is referred to herein as a demister with a coalescense effect.

After passing through demister 14, the vapors are drawn off from evaporator 14 by a pipe 18 which feeds the vapors to a compressor 19. The vapors are compressed in compressor 19, and in that way brought to a higher temperature level. The compressed vapors leaving compressor 19 are passed in a pipe 20 to the inside of the heating surfaces of heat exhanger 16 and condense in the heating surfaces of heat exchanger 16. The vapors which are fed into heat exchanger 16 comprise water vapors and non-condensable vapors such as non-condensable hydrocarbons (for example, oils found in the vapors) which do not condense in heat exchanger 16. The condensate resulting from the condensation in heat exchanger 16 thus is in the presence of a gas vapor-(water vapor) and hydrocarbon vapor-atmosphere, and is fed in this atmosphere by a pipe 21 to a separator 22. In this separator 22, the condensate is released by a controlled partial expansion from the remaining hydrocarbons, so that a purified distillate results that is fed to preheater 6a by a condensate pump 23 and a pipe 24 annd is drawn off from preheater 6a by a pipe 28. In order to effect the controlled partial expansion, different pressures are employed within heat exhanger 16 and separator 22 in order to separate the non-condensable materials from the pure distillate. During the controlled partial expansion there is produced a vapor from the expanded distillate, that is, water vapor is produced.

The oils still found within the vapors are not condensed with it in heat exchanger 16, so that the non-condensable hydrocarbons released in separator 22 together with vapor from the expanded distillate are drawn off from separator 22 by a pipe 25 and led to preheater 7. The vapor from the expanded distillate condenses in preheater 7 and this condensate is drawn off from preheater 7 by a pipe 27.

During the shower evaporation, the easily low boiling remaining hydrocarbons evaporate as well as the water. Within the shower evaporator vessel 40 during the evaporation not only vapors develop, but also all residual components or foreign materials, that is, solid materials, such as salts contained within the waste waters and/or fluid materials separate, respectively, from the vapors. These fluid materials are here referred to as waste liquor. The solid materials and a part of the waste liqor is led out of evaporator 14 to a cyclone 30 by a pipe 29 by means of a circulating pump 26. The solid materials are removed from the waste liquor by cyclone 30 and are removed from the cyclone by a pipe 31. The fluid components can be a spent lye. The remaining waste liquor, that is, the waste lquor which is not led to the cyclone 30, is rejected by means of a pump 33 and a pipe 34 through preheater 6a to a pipe 35.

In the embodiment according to FIG. 1, the thermal degassing consists of preheater 7 and degasser 9. According to FIG. 2, the thermal degassing is conducted in a common step. For this purpose the heating surfaces 7a are provided in degasser 9 and are connected to a feed pipe 27a and a drain pipe 27b. As in the embodiment according to FIG. 1, the water here is also delivered to degasser 9 by pipe 8 and a distributor or spray device 10 and the thermally degassed water is drawn off by pipe 13. The volatile hydrocarbons are again drawn off by pipe 11 and jet pump 12.

Thus, in the present invention, waste waters are to be converted into a pure boiler feed water. These waste waters contain salt, hydrocarbons and $Fe^{++}$ components. The method of treatment is such that in device 1 first solid materials, for example salts, impurities or the like, are mechanically removed. The mechanically purified waste waters are warmed up in a preheater 7 and then degassed in a degasser. Both processes can be conducted in one joint arrangement according to FIG. 2. Volatile components and especially volatile hydrocarbons are removed from the waste waters with this thermal degassing.

The mechanically purified waste waters released from the volatile components still contain low boiling remaining hydrocarbons and are fed to shower evaporator 14 where the waste waters and the low boiling remaining hydrocarbons are evaporated to produce vapors which are drawn off from shower evaporator 14 through pipe 18. Compressor 19 then condenses the vapors and even brings them to a higher temperature level. The temperature increase brought about by electric energy suffices to evaporate the waste waters in shower evaporator 14. In that way, the low boiling hydrocarbons remaining are evaporated as well and conducted togehter with the evaporated waste waters into compressor 19, then into heat exchanger 16, and finally into separator 22. The compressed water vapors condense within the evaporator pipe of heat exchanger 16. The low boiliing hydrocarbons, however, are not condensable. They can therefore be drawn off from the separator 22 by pipe 25 during the expansion in separator 22, thereby leaving the condensed water vapors in the form of a pure distillate which can be removed from separator 22.

The shower evaporator 14 is operated at a pressure such that the temperature within evaporation vessel 40 is lower than the temperature within the evaporation pipe of heat exchanger 16. In this way the waste waters which are sprayed onto the outside of heat exchanger 16 which is in the form of a pipe 16 evaporate, and then condense with delivery of the heat of condensation within pipe 16. The evaporation temperature within evaporation vessel 40 can be, for example, between 30° and 100° C., and is 3° to 5° C. lower than the condensation temperature inside heat exchanger 16.

It will be understood that the above description of the present invention is susceptible to various modifications, changes and adaptations, and the same are intended to be comprehended within the meaning and range of equivalents of the appended claims.

What is claimed is:

1. Process for the continuous production of pure water for boiler feed from waste waters containing salt, hydrocarbon and $Fe^{++}$, comprising:
   mechanically purifying the waters,
   subjecting the mechanically purified waters to a thermal degassing in a degasser under vacuum in the absence of air,
   subjecting the resulting thermally degassed waters to spray film evaporation in a spray film tube evaporator by spraying the waters onto the outside surfaces of a heat exchanger to produce vapor,
   subjecting the resulting produced vapor to a mechanical vapor compression,
   passing the resulting compressed vapor inside the heating surfaces of the spray film evaporator to condense the vapor inside the heating surfaces, while maintaining the temperature on the outside of the heating surfaces at a lower temperature than the temperature inside the heating surfaces,
   feeding the condensed water from inside the heating surfaces of the evaporator in the presence of a water vapor- and non-condensable hydrocarbons, removing the condensed water from the separator, and
   drawing off the non-condensable hydrocarbons from the top of the separator.

2. Process according to claim 1, wherein the mechanically purified water is stabilized before the thermal degassing.

3. Process according to claim 1, wherein the evaporation process and the condensation process are carried out at a temperature difference of 3° to 5° C.

4. Process according to claim 1, wherein the condensed water is partially expanded in the separator to form a water vapor stream, and wherein the thermal degassing comprises preheating the mechanically purified water with heat from the water vapor stream produced by expanding the condensed water in the separator.

5. Process according to claim 1, wherein the thermal degassing is carried out by heatng and degassing the water by feeding the water onto heating surfaces contained in a degasser.

6. Process according to claim 1, wherein the vapors resulting from the spray film evaporation are passed through a demister with a coalesence effect before the mechanical vapor compression.

7. Process according to claim 1, wherein volatile hydrocarbons from the degassing step are removed from the degasser by means of a vacuum pump or a jet compressor.

8. Process according to claim 1, wherein a waste liquor separates from the vapor produced by the evaporation and is passed through a cyclone, from which solid components are drawn off.

9. Process according to claim 1, wherein the step of mechanically purifying the waste waters comprises filtering the waste waters.

10. Process according to claim 1, wherein the spraying comprises distributing the waters as a thin film on the outside surfaces of a horizontal tube evaporator.

11. Process according to claim 4, wherein the water vapor stream contains non-condensable hydrocarbon gases which are drawn off from the separator, and heat from these non-condensable hydrocarbon gases is used for the preheating.

12. Process according to claim 11, wherein the preheating comprises condensing the water vapor stream.

13. Process according to claim 4, wherein the preheatng comprises condensing the water vapor stream.

* * * * *